Aug. 10, 1948.    D. BRADBURY ET AL    2,446,523
FUEL CONTROL APPARATUS FOR LIQUID FUEL BURNERS
Filed Jan. 31, 1944
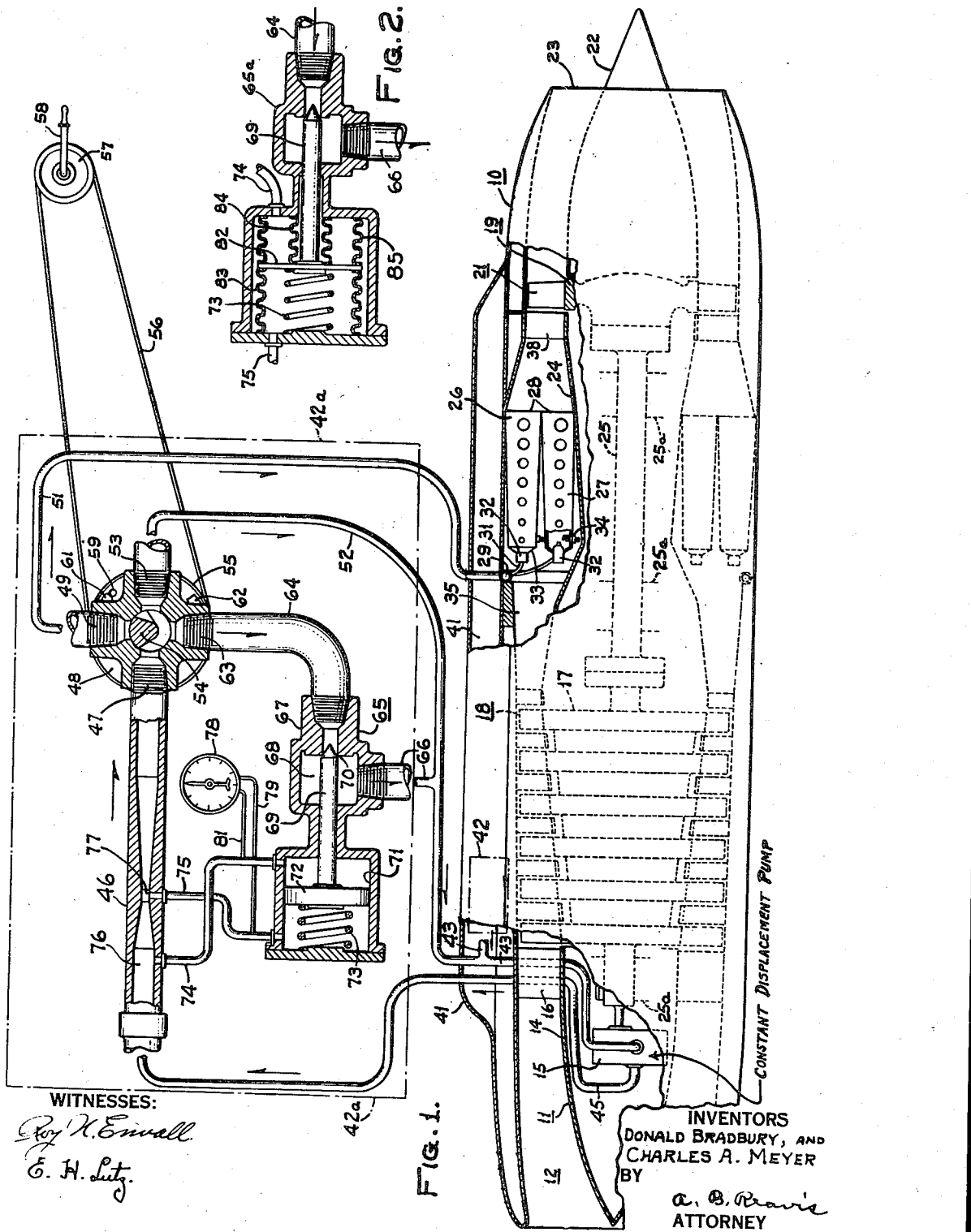
WITNESSES:
Roy H. Enwall
E. H. Lutz
INVENTORS
DONALD BRADBURY, AND
CHARLES A. MEYER
BY
A. B. Ravis
ATTORNEY Patented Aug. 10, 1948

2,446,523

UNITED STATES PATENT OFFICE 2,446,523

FUEL CONTROL APPARATUS FOR LIQUID FUEL BURNERS

Donald Bradbury, Prospect Park, and Charles A. Meyer, Drexel Hill, Pa., assignors to Westinghouse Electric Corporation, East Pittsburgh, Pa., a corporation of Pennsylvania Application January 31, 1944, Serial No. 520,564

2 Claims. (Cl. 158—36.4)

This invention relates to power plants and particularly to a control system for a gas turbine power plant and it has for an object to provide an improved device of the character set forth.

The present invention, while not limited thereto, is particularly adapted to be used to control a gas turbine power plant like that disclosed in the patent to Stewart Way, No. 2,405,723, issued August 13, 1946, and assigned to the assignee of the present invention. A power plant of the type disclosed in the mentioned Way patent includes an air compressor, an air heating apparatus, a turbine, and a propulsion jet nozzle all housed within a streamlined tubular casing. A plant of this character is particularly suitable for propelling aircraft at high speeds and operates generally as follows: Air enters the forward end of the tubular casing and is compressed in the compressor, the compressed air is then heated in the heating apparatus by combustion of fuel supported by the compressed air. The resulting motive fluid comprising the products of combustion and the excess compressed air drives the turbine and is then discharged through the propulsion nozzle as a jet, the reaction of which serves to propel the aircraft. The turbine extracts at least sufficient power from the motive fluid to drive the compressor and auxiliaries. The fuel is supplied to the air heating apparatus, under the control of a throttle valve, by means of a positive displacement pump which is preferably driven by the turbine.

A power plant of this character is designed to operate at relatively high speeds, for example, 18,000 R. P. M. or more, and it is desirable that means be provided to prevent dangerous overspeeding of the turbine shaft. Under normal conditions the rotational speed of the turbine shaft is dependent on the rate at which fuel is supplied to the combustion apparatus and in accordance with the present invention the fuel rate is controlled automatically to prevent such dangerous overspeeding.

It is, accordingly, a further object of the invention to provide means for measuring and for limiting the rotational speed of a gas turbine.

These and other objects are effected by the invention as will be apparent from the following description and claims taken in connection with the accompanying drawings, forming a part of this application, in which:

Fig. 1 is a side elevational view of a gas turbine power plant in which the present invention is incorporated, portions of the outer casing structure being broken away to show certain details of construction and the fuel control and turbine speed governing system of the present invention being shown diagrammatically with the elements thereof in section, and Fig. 2 is a longitudinal sectional view of a modified form of a control valve which may be employed in the present invention.

The power plant shown in Fig. 1 comprises in general an outer casing structure 10 open from end to end and having a central core structure 11 providing an annular flow passage 12 which extends fore and aft with respect to the aircraft in which it is mounted. The central core structure 11 is supported by the casing structure along its longitudinal axis and includes a hollow fairing cone 14 defining with the forward or left end, as viewed in Fig. 1, of the casing 10 the inlet portion of the flow passage 12. The fairing cone houses a fuel pump, generally indicated 15, and other auxiliary apparatus (not shown) and is supported from the casing by hollow compressor guide vanes 16. The core structure also includes a rotor 17 of an axial flow compressor 18, the fixed blades of which are carried by the casing 10, a rotor 19 of a turbine 21 and a conical tailpiece 22 which defines with the rear end of the casing structure a propulsion nozzle 23. The intermediate portion of the core structure between the compressor and the turbine comprises an inner wall structure 24 which houses a shaft 25 connecting the turbine rotor 19 and compressor rotor 17, and defines with the casing 10 an annular combustion chamber 26. The shaft 25 is journaled in suitable bearings 25a carried by the outer casing.

The combustion chamber 26 is provided with a suitable burner or burners, such as shown in the copending application of Way et al., Serial No. 511,468, filed November 23, 1943, and assigned to the assignee of the present invention, for heating the air compressed by the compressor. In the embodiment shown, a plurality of perforated, tapered, burner tubes 27 are mounted in the annular combustion chamber 26 with their large open ends 28 directed downstream. Fuel under pressure is supplied to the burner tubes from a manifold pipe 29 connected to a fuel supply as hereinafter described and is fed through branch pipes 31 to atomizing nozzles 32 extending into the burner tubes through the small closed ends 33 thereof. Suitable means, including spark plugs 34 extending into the burner tubes, are provided for igniting the air-fuel mixture.

The present invention is not concerned with the specific design of the apparatus thus far referred to although it is preferably constructed in accordance with the disclosure of the mentioned Way patent and Way et al. application.

The power plant operates substantially as follows: Air enters the casing 10 at the inlet of the flow passage 12, is compressed by the compressor, and flows into a diffuser or divergent portion 35 of the flow passage which effects a further compression of the air. The compressed air then passes through the openings provided in the walls of the burner tubes 27. The compressed air mixes with the fuel atomized in the tubes by the nozzles 32. The air and fuel mixture is ignated by the spark plugs and burns steadily thereafter. The hot gases or motive fluid comprising the products of combustion and the excess air heated by the combustion on leaving the burner tubes 27 is directed by fixed guide vanes or nozzles 38 of the turbine 21 into the blade passage of the turbine rotor 19. The turbine extracts at least sufficient energy from the motive fluid to drive the compressor 18, pump 15 and other auxiliary apparatus that may be housed in the fairing cone 14. The spent gases leaving the turbine are discharged through the propulsion nozzle 23 at a high velocity so that the remaining energy in the motive fluid is available to propel the aircraft. The tailpiece 22 is preferably axially movable with respect to the casing structure so that the back pressure on the turbine and the jet effect produced by the nozzle may be varied.

The present invention is particularly concerned with measuring the speed of rotation of the turbine and controlling the rate at which fuel is supplied to the burner tubes 27 in order to maintain the speed of the turbine below a dangerous value.

The speed measuring and speed controlling apparatus may conveniently be housed within a tunnel 41 formed in the top of the casing 10 which also houses lubricating and fuel oil pipes and ignition wires. This apparatus is preferably located in the region enclosed by the small broken rectangle 42 but for clarity it is shown on an enlarged scale above the casing 10 with the parts enclosed in a broken rectangle 42a which corresponds to the rectangle 42.

The fuel supply system for the burner tubes comprises the pump 15, which is of the constant displacement type and driven by the turbine so that its output is independent of pressure and depends only on the rotational speed of the turbine shaft, a throttle valve 48 which regulates the amount of fuel going to the burners by by-passing fuel to the inlet side of the pump, and a control valve 65, which, when open, also by-passes fuel to the inlet side of the pump. The control valve 65 is actuated by the differential in pressure between the inlet and throat of a Venturi tube 46 which in turn is a measure of the rate of flow through the Venturi tube and is calibrated to open when the flow exceeds a predetermined value. It is to be understood that the control valve 65 may be actuated by the pressure difference between the throat and exit of the Venturi tube 46, if desired.

The rate of flow to the burners is determined by the pressure drop across the atomizing nozzles. This pressure drop is controlled by the total resistance to flow of the constant volume of fuel output of the pump and is determined by the area of the nozzles plus that of the throttle valve by-pass. Absolute pressure in the combustion chamber varies widely depending on operating conditions, that is, pressure ratio and atmospheric pressure. Thus the pressure in the fuel supply system fluctuates over a range from near atmospheric pressure to the rated pressure of the pump 15. In the particular embodiment shown, the maximum pressure necessary for maximum flow through the burner nozzles at maximum pressure in the combustion chamber is the maximum rated pressure of the pump. Thus the present speed control device must have a very small total pressure drop as well as be independent of the pressure level.

The Venturi tube 46 satisfies both of these last-mentioned requirements. The total output of the pump passes through the Venturi tube and by measuring the pressure drop from the inlet to the throat of the Venturi tube, which is a function only of the volume of fuel flowing therethrough, independent of absolute pressure level, a measure of the speed of the turbine shaft is obtained, since the volume output of the constant displacement pump depends only on the rotational speed of the pump and also independent of pressure level. This pressure drop in the Venturi tub is also used to control the flow of fuel to the burners, since the speed is dependent on the rate at which fuel is supplied so that when th pressure drop reaches a predetermined value, which is basd on maximum allowable speed, fuel is by-passed by the control valve from the outlet of the pump to the inlet thereof and, in this way, prevents the turbine from exceeding a predetermined speed.

The fuel, such as gasoline, for the burner tubes 27 flows from a suitable tank (not shown) carried by the aircraft, into a main supply pipe 43 to the inlet side of the pump 15. The outlet or discharge side of the pump is connected to a pipe 45, which, in turn, communicates through the Venturi tube 46, with inlet 47 of a four-way, rotary throttle valve, generally indicated 48. One outlet 49 of the valve 48 is connected by a pipe 51 to the manifold pipe 29 of the burner tubes.

Regulation of the rate of flow of fuel to the burner tubes is effected by by-passing more or less of the fuel from the inlet 47 of the throttle valve to the inlet of the pump by means of a pipe 52 leading from a second outlet 53 of the throttle valve to the pump inlet pipe 43.

The throttle valve 48 comprises a valve body in which a rotatable valve member 54 is received. The valve member is rotated, to regulate the amount of oil flowing to the burners and through the by-pass pipe 52, by any suitable means, for example, the valve member has a pulley 55 connected by a belt 56 to a pulley 57 to which is fixed a hand throttle lever 58. The throttle lever 58 and pulley 57 are located for convenient manipulation by the pilot of the aircraft.

In Fig. 1, the the throttle valve 48 is shown in closed position so that all of the fuel is by-passed or returned to the pump 15 through pipe 52. In this position, a pin 59 carried by wheel 55 engages a stop 61 fixed on the valve body. The valve is fully open when the pin 59 engages a second stop 62 on the valve body. It will be noted that from closed position to full open position of the throttle valve a third outlet 63 of the valve body always remains open.

The outlet 63 is connected by a pipe 64 to the control valve 65, which, in turn, communicates through a pipe 66 and pipes 52 and 43 to the inlet of pump 15. If desired the outlet 63 may be dispensed with and pipe 64 connected to the outlet of the Venturi tube 46 by a T connection. The valve 65 is normally closed but is opened, as will appear later, to by-pass fuel flowing into the throttle valve 48 and thereby reduce the amount of fuel flowing to the burners in the event overspeeding of the turbine occurs.

The valve 65 comprises a valve body 67 having a valve chamber 68 with which the inlet pipe 64 and the outlet pipe 66 communicate. A stemmed valve 69 cooperates with a valve seat 70 in the chamber for controlling the flow through the pipes 64 and 66. The stem 69 of the valve extends into a cylinder 71 formed in the valve body and carries a piston 72. The valve stem 69 is biased to valve closing position by a compression spring 73 acting on the piston.

Since the pressure drop from the inlet to the throat of a Venturi tube is a function only of the rate of flow through the Venturi tube and the flow in the Venturi tube 46 is dependent on rotational speed of the turbine, this pressure drop is a measure of the rotational speed of the turbine and is used to regulate the supply of fuel to the burners since speed of the turbine is dependent on rate at which fuel is supplied to burners to maintain the turbine speed below a predetermined maximum value. This is done by providing pipes 74 and 75 which connect the inlet 76 and throat 77, respectively, of the Venturi tube with the cylinder 71 at opposite sides of the piston 72.

Thus as the rate of flow of fuel through the Venturi tube increases, the differential in pressure acting on opposite sides of the piston 72 also increases and by selecting a suitable spring 73 the valve 65 may be arranged to begin to open when the speed of the turbine attains a predetermined value. Opening of the valve 65 by-passes fuel from the throttle valve 48 and reduces the amount of fuel going to the burners resulting in a lowering of the turbine speed. As the turbine speed falls off, the rate at which the pump 15 delivers oil also decreases so that the valve 65 tends to reclose until a point of equilibrium is reached.

A pressure gauge 78 connected by means of pipes 79 and 81 to the pipes 74 and 75 may be provided with a scale calibrated in R. P. M. to provide a direct indication of the turbine speed.

In Fig. 2, there is shown a slightly modified form of control valve 65a in which the piston 72 is replaced by a disc 82 and bellows 83 and 85 are provided on opposite sides of the disc 82. The pipes 75 and 74 extending from the throat 77 and inlet 76, respectively, of the Venturi tube, open to the bellows 83 and 85, respectively. As the pressure within the bellows 85 exceeds the pressure within the bellows 83 by an amount sufficient to deflect the compression spring 73, the valve 65a opens, as in the case of the valve 65, to decrease the supply of fuel to the burners 27. Except for the provision of the bellows the structure of valve 65a may be identical with the valve 65. The bellows 84 serves to prevent leakage around the valve stem 69.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:
1. In apparatus for supplying liquid fuel to a burner or burners to provide heated products of combustion serving as motive fluid to operate a prime mover, a pump operated by the prime mover for supplying liquid fuel at a rate dependent upon prime mover speed; a valve body having a valve chamber and provided with inlet, supply, by-pass, and outlet ports communicating with said valve chamber; a first conduit connecting said supply port to the burner or burners; a second conduit for supplying fuel from said pump to said inlet port; a third conduit connecting said outlet port with the inlet side of the pump; a fourth conduit providing communication between the by-pass port and the third conduit; a valve for opening and closing the by-pass; means for biasing the valve to closed position; means responsive to the rate at which liquid fuel is supplied to said second conduit to open the valve against the force of the biasing means; a valve in said chamber and movable from the position lapping said supply port with the outlet port open to a position lapping the outlet port with the supply port open and vice versa; and means for moving the last-named valve.

2. In apparatus for supplying liquid fuel to a burner or burners to provide heated products of combustion serving as motive fluid to operate a prime mover, a pump operated by the prime mover for supplying liquid fuel at a rate dependent upon prime mover speed; a valve body having a valve chamber and provided with inlet, supply, by-pass, and outlet ports communicating with said valve chamber; a first conduit connecting said supply port to the burner or burners; a second conduit for supplying fuel from said pump to said inlet port; a third conduit connecting said outlet port with the inlet side of the pump; a fourth conduit providing communication between the by-pass port and the third conduit; a valve for opening and closing the by-pass; means for biasing the valve to closed position; means providing a pressure differential which is a function of the rate at which liquid fuel is delivered by the pump to the second conduit; means utilizing the pressure differential to open the valve against the force of the biasing means; a valve in said chamber and movable from the position lapping said supply port with the outlet port open to a position lapping the outlet port with the supply port open and vice versa; and means for moving the last-named valve.

DONALD BRADBURY.
CHARLES A. MEYER.

REFERENCES CITED

The following references are of record in the file of this patent:

UNITED STATES PATENTS

| Number | Name | Date |
|---|---|---|
| 1,446,464 | Horvath | Feb. 27, 1923 |
| 1,713,833 | Kochendorfer | May 21, 1929 |
| 1,886,472 | Delaney | Nov. 8, 1932 |
| 2,280,835 | Lysholm | Apr. 28, 1942 |
| 2,281,411 | Campbell | Apr. 28, 1942 |
| 2,330,558 | Curtis | Sept. 28, 1943 |